(12) United States Patent
Komatsu et al.

(10) Patent No.: US 7,059,150 B2
(45) Date of Patent: Jun. 13, 2006

(54) VAPOR-COMPRESSION REFRIGERANT CYCLE SYSTEM WITH EJECTOR

(75) Inventors: Hirofumi Komatsu, Anjo (JP); Suteo Kobayashi, Mizuho (JP); Hiroshi Oshitani, Toyota (JP); Katsuya Kusano, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/236,754

(22) Filed: Sep. 27, 2005

(65) Prior Publication Data

US 2006/0065011 A1   Mar. 30, 2006

(30) Foreign Application Priority Data

Sep. 29, 2004  (JP)  ............... 2004-284098
Feb. 3, 2005   (JP)  ............... 2005-028165

(51) Int. Cl.
*F25B 1/06*  (2006.01)

(52) U.S. Cl. ............... 62/500; 62/191; 62/527

(58) Field of Classification Search ............ 62/500, 62/527, 528, 175, 191, 86
See application file for complete search history.

(56) References Cited

U.S. PATENT DOCUMENTS

| 6,477,857 | B1 | 11/2002 | Takeuchi et al. |
| 6,574,987 | B1 | 6/2003 | Takeuchi et al. |
| 6,584,794 | B1* | 7/2003 | Takeuchi et al. ............ 62/278 |
| 2005/0178150 | A1 | 8/2005 | Oshitani et al. |

FOREIGN PATENT DOCUMENTS

JP   2005-037056   2/2005

* cited by examiner

*Primary Examiner*—Melvin Jones
(74) *Attorney, Agent, or Firm*—Harness, Dickey & Pierce, PLC

(57) ABSTRACT

A vapor-compression refrigerant cycle system having an ejector includes a first evaporator for evaporating refrigerant from a pressure-increasing portion of the ejector, and a second evaporator for evaporating refrigerant to be drawn into a refrigerant suction port of the ejector. Furthermore, a valve member for opening and closing a refrigerant passage of the second evaporator is arranged in serious with the second evaporator in a refrigerant flow, and refrigerant flowing out of the second evaporator flows into the refrigerant suction port through a refrigerant suction pipe. The system is provided to restrict lubrication oil contained in refrigerant from being introduced from the ejector into and staying in the refrigerant suction pipe when the valve member is closed. For example, the refrigerant suction port is provided at an upper side of the ejector.

18 Claims, 11 Drawing Sheets

VAPOR-COMPRESSION REFRIGERANT CYCLE SYSTEM WITH EJECTOR

CROSS REFERENCE TO RELATED APPLICATION

This application is based on Japanese Patent Applications No. 2004-284098 filed on Sep. 29, 2004 and No. 2005-28165 filed on Feb. 3, 2005, the contents of which are incorporated herein by reference in its entirety.

FIELD OF THE INVENTION

The present invention relates to a vapor-compression refrigerant cycle system having an ejector used as a refrigerant decompression unit and a refrigerant circulating unit. The vapor-compression refrigerant cycle system is suitably used for a vehicle air conditioner, for example.

BACKGROUND OF THE INVENTION

A vapor-compression refrigerant cycle system (ejector cycle system) using an ejector as a refrigerant decompression unit and a refrigerant circulating unit is described in JP-B1-3322263 (corresponding to U.S. Pat. No. 6,574,987 and U.S. Pat. No. 6,477,857), for example. In this vapor-compression refrigerant cycle system, a first evaporator is arranged between the ejector and a gas-liquid separator located downstream from the ejector, and a second evaporator is arranged between a liquid refrigerant outlet side of the gas-liquid separator and a refrigerant suction port of the ejector, as an example.

The inventors of this application studied an example for switching a cooling function of the second evaporator. In this example, an electromagnetic valve is provided at an upstream portion of the second evaporator, and the electromagnetic valve is closed when the cooling function of the second evaporator stops. In this case, when the electromagnetic valve is closed, a refrigerant stream drawn from the second evaporator into the refrigerant suction port of the ejector is not generated. In this example, if the refrigerant suction port is opened at a lower portion of the ejector, lubrication oil (i.e., refrigerator oil) contained in a refrigerant flowing through the inside of the ejector falls into the refrigerant suction port by the weight of the lubrication oil. Accordingly, the lubrication oil stays in a refrigerant suction pipe connected to the refrigerant suction port of the ejector and the second evaporator, when the electromagnetic valve is closed. In this case, a returning amount of the lubrication oil returning to the compressor is reduced, and a lubrication oil shortage may be caused in the compressor.

SUMMARY OF THE INVENTION

In view of the above-described problems, it is an object of the present invention to provide a vapor-compression refrigerant cycle system having an ejector, which can prevent a returning amount of lubrication oil returning to a compressor from being reduced when a cooling function of an evaporator connected to a refrigerant suction port of the ejector stops.

According to an aspect of the present invention, a vapor-compression refrigerant cycle system includes a compressor which compresses refrigerant, a refrigerant radiator for cooling high-pressure refrigerant discharged from the compressor, and an ejector. The ejector includes a nozzle for decompressing and expanding refrigerant from the refrigerant radiator, a refrigerant suction port from which gas refrigerant is drawn by a refrigerant steam jetted from the nozzle, and a pressure-increasing portion in which the refrigerant jetted from the nozzle and the gas refrigerant drawn from the refrigerant suction port are mixed and pressure of the refrigerant is increased by converting the speed energy to pressure energy.

In the vapor-compression refrigerant cycle system, a first evaporator for evaporating refrigerant flowing out of the pressure-increasing portion of the ejector is located at a downstream side of the ejector, a second evaporator for evaporating refrigerant to be drawn into the refrigerant suction port of the ejector is provided, a valve member for opening and closing a refrigerant passage of the second evaporator is arranged in serious with the second evaporator in a refrigerant flow, and a refrigerant suction pipe is located to have a first end connected to a refrigerant outlet of the second evaporator and a second end connected to the refrigerant suction port of the ejector. Furthermore, the system is provided with means for restricting lubrication oil contained in refrigerant from being introduced into and staying in the refrigerant suction pipe through the refrigerant suction port when the valve member is closed. Thus, it can prevent the lubrication oil returning to the compressor from being insufficient when the valve member is closed, and lubrication property of the compressor can be improved.

For example, the refrigerant suction port is provided at an upper side of the ejector. In this case, it can prevent the lubrication oil from falling into the refrigerant suction port in the ejector with a simple structure.

Alternatively, the refrigerant suction pipe can be provided with a standing portion at a downstream position adjacent to the refrigerant suction port, and the standing portion extends upwardly to a position higher than the refrigerant suction port. In this case, the lubrication oil amount staying in the refrigerant suction pipe can be controlled to a small amount, even when the refrigerant suction port is provided at a lower portion of the ejector.

Alternatively, a check valve can be located at an inlet portion of the refrigerant suction port to only allow a refrigerant flow from the refrigerant suction pipe into the refrigerant suction port. Therefore, even when the refrigerant suction port is provided at a lower portion of the ejector, the check valve prevents the lubrication oil from flowing into the refrigerant suction pipe from the refrigerant suction port.

In the vapor-compression refrigerant cycle system, an auxiliary valve member can be arranged in a refrigerant passage through which refrigerant from the second evaporator is introduced to the refrigerant suction port of the compressor. In this case, the valve member is located at an inlet portion of the refrigerant suction port of the ejector, and the auxiliary valve member is opened when the valve member is closed, so that the refrigerant flowing out of the second evaporator flows into the suction side of the compressor. Accordingly, even when the refrigerant suction port is provided at a lower portion of the ejector, lubrication oil is prevented from staying in the refrigerant suction pipe by the valve member and the auxiliary valve member.

The second evaporator can be arranged to perform a cooling operation for cooling air, and a blower for blowing air to the second evaporator can be provided. In this case, the valve member is opened so that refrigerant always flows into the second evaporator when the compressor operates, and the blower is stopped when the cooling function of the second evaporator is stopped. Because the refrigerant always flows into the second evaporator, a refrigerant stream from the second evaporator to the refrigerant suction port of the ejector can be always formed, thereby preventing the lubrication oil from staying in the refrigerant suction pipe.

Alternatively, the valve member can be forcibly opened, when a predetermined time passes after the valve member is closed while the compressor operates. Therefore, it can prevent a shortage of the lubrication oil in the compressor.

Furthermore, when the cooling operation of the second evaporator is stopped when the compressor stats operating, the valve member is opened once for a predetermined time. Accordingly, even at a start time of the compressor, the lubrication oil staying in the second evaporator and the refrigerant suction pipe can be returned to the compressor, thereby preventing a shortage of the lubrication oil in the compressor.

In the vapor-compression refrigerant cycle system, a bypass passage, through which refrigerant from the refrigerant radiator flows into the refrigerant suction port while bypassing the second evaporator and the valve member, can be provided. In this case, an auxiliary valve member is located in the bypass passage for opening and closing the bypass passage, and the auxiliary valve member is opened when the valve member is closed while the compressor operates. Accordingly, when the refrigerant evaporating function (e.g., cooling function) of the second evaporator is stopped, it can prevent the lubrication oil from being insufficient in the compressor, and lubrication property of the compressor can be effectively improved.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS

Preferred embodiments of the present invention will be described hereinafter with reference to the accompanying drawings.

First Embodiment

Figure 1:
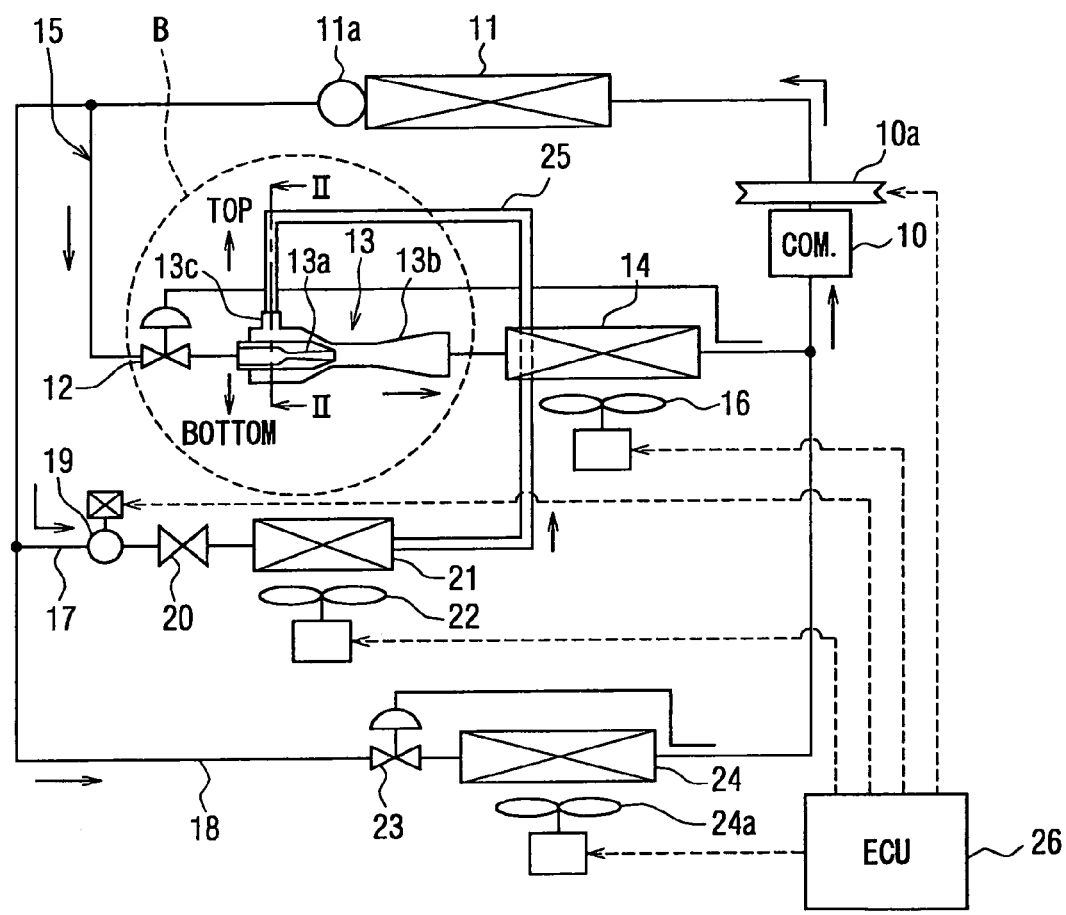
FIG. 1 is a schematic diagram showing a vapor-compression refrigerant cycle system having an ejector, according to a first embodiment of the present invention.

In the first embodiment, a vapor-compression refrigerant cycle system having an ejector, shown in FIG. 1, is typically used for a vehicle air conditioner, as an example. The vapor-compression refrigerant cycle system includes a main refrigerant path 15 in which refrigerant flows in this order of a discharge side of a compressor 10, a refrigerant radiator 11, a flow adjustment valve 12, an ejector 13, a first evaporator 14 and a suction side of the compressor 10.

In this embodiment, the compressor 10 for compressing refrigerant is driven and rotated by a vehicle engine through a belt and an electromagnetic clutch 10a, etc. The operation of the compressor 10 is switched and controlled by the electromagnetic clutch 10a. In this case, by controlling an on/off operation ratio of the compressor 10, a refrigerant discharge capacity of the compressor 10 can be controlled.

The refrigerant radiator 11 cools high-pressure refrigerant discharged from the compressor 10 by performing a heat exchange between the high-pressure refrigerant and outside air (i.e., air outside a passenger compartment) blown by a cooling fan (now shown). In this embodiment, as an example, the refrigerant radiator 11 is a condenser integrated with a gas-liquid separator 11a. The separator-integrated condenser (11) is constructed with a condensation portion for cooling and condensing the high-pressure refrigerant discharged from the compressor 10, the gas-liquid separator 11a in which the refrigerant from the condensation portion is separated into gas refrigerant and liquid refrigerant, and a super-cooling portion in which the liquid refrigerant separated in the gas-liquid separator 11a is super-cooled.

The flow adjustment valve 12 is located at a downstream side of the refrigerant radiator 11 to adjust a refrigerant flow amount in the first evaporator 14. As an example, a thermal expansion valve is used as the flow control valve 12, in this embodiment. In this case, an open degree of the flow adjustment valve 12 (thermal expansion valve) is adjusted so that a superheating degree of refrigerant at a refrigerant outlet of the first evaporator 14 becomes a predetermined value.

The ejector 13 is a kinetic pump (refer to JIS Z 8126 No. 2.1.2.3) for performing a transporting of a fluid by entrainment of a jet flow of a drive fluid injected at a high speed.

Specifically, the ejector 13 includes a nozzle portion 13a and a diffuser portion 13b. The nozzle portion 13a decompresses and expands refrigerant flowing from the flow adjustment valve 12 substantially in isentropic by reducing a refrigerant passage area. The refrigerant flow speed is increased in the nozzle portion 13a by converting pressure energy of the refrigerant to speed energy of the refrigerant.

The ejector 13 has a refrigerant suction port 13c from which gas refrigerant from the second evaporator 21 is drawn by the high speed refrigerant flow jetted from the nozzle portion 13a.

In the diffuser portion 13b, the speed energy of refrigerant (dynamic pressure) is converted to the pressure energy of refrigerant (stationary pressure) by gradually increasing a sectional passage area of the diffuser portion 13b. Accordingly, the refrigerant pressure is increased in the diffuser portion 13b.

The refrigerant flowing out of the diffuser portion 13b flows into the first evaporator 14. For example, the first evaporator 14 is arranged in an air passage of a front air conditioning unit to cool air to be blown into a front side in the passenger compartment.

In this case, a first blower 16 (e.g., electrical blower) is disposed in the front air conditioning unit so that air to be blown into the front side of the passenger compartment is sent to the first evaporator 14. Therefore, low-pressure refrigerant decompressed in the ejector 13 is evaporated in the first evaporator 14 by absorbing heat from air passing through the first evaporator 14, thereby the air to be blown into the front side of the passenger compartment is dehumidified and cooled. The gas refrigerant evaporated in the first evaporator 14 is drawn into the compressor 10, and is circulated in the main refrigerant circulating path 15.

First and second branch passages 17, 18 branched from the main refrigerant circulating path 15 are provided at a refrigerant outlet portion of the refrigerant radiator 11. The first branch passage 17 is a refrigerant passage from the refrigerant outlet portion of the refrigerant radiator 11 to the refrigerant suction port 13c of the ejector 13. In the first branch passage 17, there is provided with an electromagnetic valve 19, a throttle mechanism 20 and a second evaporator 21 in serious, in this order from a refrigerant upstream side to a refrigerant downstream side.

The electromagnetic valve 19 is a switching valve for switching a refrigerant flow in the first branch passage 17. The throttle mechanism 20 decompresses high-pressure refrigerant from the refrigerant outlet portion of the refrigerant radiator 11 into gas-liquid two-phase refrigerant having a low temperature and low pressure, and also adjusts a flow amount of refrigerant flowing into the second evaporator 21.

For example, the second evaporator 21 is located in a refrigerator mounted on a vehicle, and cools air blown by a second blower 22 (e.g., electrical blower) located in the refrigerator. Generally, a variation in a thermal load of the refrigerator is small, a fixed throttle can be used as the throttle mechanism 20. However, a suitable variable throttle can be used as the throttle mechanism 20, and the electromagnetic valve 19 and the throttle mechanism 20 can be constructed with a single member.

The second branch passage 18 is a refrigerant passage from the refrigerant outlet portion of the refrigerant radiator 11 to the suction side of the compressor 10. In the second branch passage 18, a throttle mechanism 23 and a third evaporator 24 are arranged in serious in this order. For example, the third evaporator 24 is arranged in an air passage of a rear air conditioning unit (not shown) to cool air to be blown to a rear seat side in the passenger compartment.

For example, air is sent to the third evaporator 24 by a third blower (e.g., electrical blower) 24a, which is located in the rear air conditioning unit, and the cooled air from the third evaporator 24 is blown toward the rear seat side in the passenger compartment. Low-pressure refrigerant after decompressed in the throttle mechanism 23 is evaporated in the third evaporator 24 by absorbing heat from air to be blown to the rear seal side of the passenger compartment, so that air to be blown toward the rear seat side of the passenger compartment is cooled and cooling function can be obtained. In this example shown in FIG. 1, a thermal expansion valve is used as the throttle mechanism 23, and a flow amount of refrigerant flowing into the third evaporator 24 is adjusted by the throttle mechanism 23. In this case, a valve opening degree of the throttle mechanism 23 can be adjusted so that a super-heating degree of the refrigerant at the outlet of the evaporator 24 becomes a predetermined value.

Figure 2:
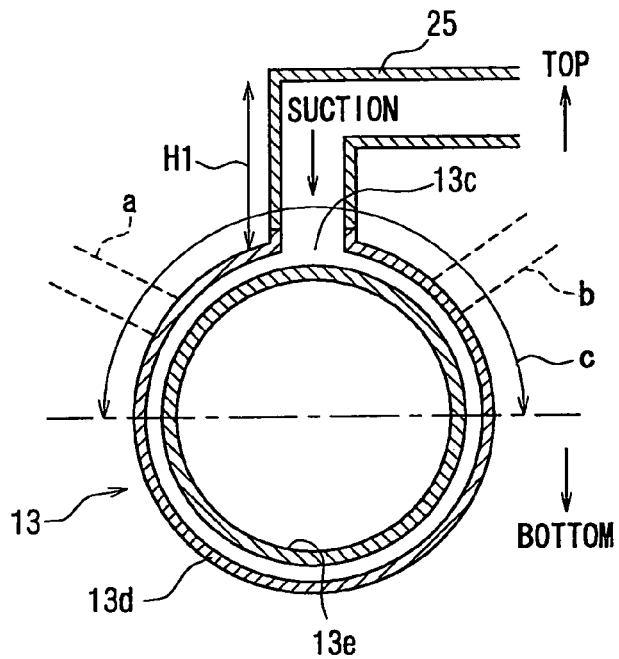
FIG. 2 is a cross-sectional view taken along line II—II in FIG. 1.

FIG. 2 is a cross-sectional view of the ejector 13 taken along line II—II in FIG. 1. The top-bottom direction in FIG. 2 corresponds to the top-bottom direction when the ejector 13 is mounted to a vehicle. As shown in FIG. 2, the ejector 13 has a cylindrical housing 13d, and the refrigerant suction port 13c is opened in the housing 13d at a top portion.

A refrigerant suction pipe 25 has a vertically extending portion that is connected to the refrigerant suction port 13c and has a height H1. The refrigerant suction pipe 25 is a refrigerant pipe from the outlet portion of the second evaporator 21 to the refrigerant suction port 13c of the ejector 13, as shown in FIG. 1. In FIG. 2, a cylindrical portion 13e positioned inside the housing 13d by a predetermined clearance constructs an inlet passage of the nozzle portion 13.

The electromagnetic clutch 10a of the compressor 10, the first to third blowers 16, 22, 24a and the electromagnetic valve 19, etc. are electrically controlled by control signals from a control device 26. The control device 26 is constructed with a microcomputer and circuits around the microcomputer. Detection signals of a sensor group (not shown) and operation signals of an operation member of an air-conditioning operation panel are input to the control device 26.

Next, operation of the vapor-compression refrigerant cycle system according to this embodiment will be described. When a cooling operation (cooling function) is necessary for the refrigerator mounted to the vehicle, a refrigerator switch (not shown) of the air-conditioning operation panel is turned on by a passenger. In the cooling operation of the refrigerator, the operation of the electromagnetic valve 19 is controlled by the control device 26 so that the electromagnetic valve 19 is opened. In this state, when the compressor 10 is operated by the vehicle engine, the compressor 10 compresses refrigerant to be in a high-pressure and high-temperature state. The high-pressure and high-temperature refrigerant discharged from the compressor 10 flows into the refrigerant radiator 11, and is cooled and condensed by outside air.

The cooled refrigerant flowing out of the refrigerant radiator 11 is branched into a refrigerant stream flowing through the main refrigerant circulating path 15, a refrigerant stream flowing through the first branch passage 17 and a refrigerant stream flowing through the second branch passage 18.

The refrigerant flowing through the main refrigerant circulating path 15 passes through the flow adjustment valve 12, and flows into the ejector 13. The refrigerant flowing into the ejector 13 from the flow adjustment valve 12 is decompressed and expanded in the nozzle portion 13a. That is, the pressure energy of the refrigerant is converted to the speed energy of the refrigerant in the nozzle portion 13a, and high-speed refrigerant is jetted from a jet port of the nozzle portion 13a. At this time, a refrigerant pressure is reduced around the outlet of the nozzle portion 13a due to the high-speed jet flow of refrigerant, so that gas refrigerant evaporated in the second evaporator 21 is drawn from the refrigerant suction port 13c.

The refrigerant jetted from the nozzle portion 13 and the refrigerant drawn from the refrigerant suction port 13c are mixed at a downstream side of the nozzle portion 13a, and flows into the diffuser portion 13b. Because the passage sectional area is enlarged in the diffuser portion 13b, the speed energy of the refrigerant is converted to the pressure energy in the diffuser portion 13b, so that the pressure of refrigerant is increased in the diffuser portion 13b. The refrigerant flowing out of an outlet port of the diffuser portion 13b flows into the first evaporator 14.

In the first evaporator 14, the refrigerant is evaporated by absorbing heat from air passing through the first evaporator 14 so that air to be blown to the front seat side in the passenger compartment is cooled. The gas refrigerant from the first evaporator 14 is drawn into the compressor 10 and is compressed in the compressor 10 to be circulated in the main refrigerant circulating path 15. The cool air cooled in the evaporator 14 is blown by the first blower 16 toward the front seat side in the passenger compartment. Accordingly, a cooling operation for cooling the front seat area of the passenger compartment can be performed.

When the flow adjustment valve 12 is a thermal expansion valve, a valve opening degree of the flow adjustment valve 12 can be adjusted so that the super-heating degree of refrigerant at the outlet portion of the first evaporator 14 becomes a predetermined value, and a refrigerant amount flowing in the first evaporator 14 can be adjusted.

The refrigerant branched from the main refrigerant circulating path 15 into the second branch passage 18 is decompressed in the throttle mechanism 23. Low-pressure refrigerant decompressed in the throttle mechanism 23 flows into the third evaporator 24, and is evaporated by absorbing heat from air to be blown toward the rear seat side of the passenger compartment. The evaporated gas refrigerant from the third evaporator 24 is drawn into the suction side of the compressor 10 and is compressed in the compressor 10. The cool air cooled by the third evaporator 24 is blown toward the rear seat area in the passenger compartment by the third blower 24a so as to cool the rear seat area in the passenger compartment.

The refrigerant from the first evaporator 14 and the refrigerant from the third evaporator 24 are joined at a downstream refrigerant side of the first evaporator 14 and the third evaporator 24 before the refrigerant flows into the compressor 10. Therefore, a refrigerant evaporation pressure of the first evaporator 14 is the same as a refrigerant evaporation pressure of the third evaporator 24. As a result, a refrigerant evaporation temperature is the same at both the first and third evaporators 10 and 24, and cooling capacity having the same temperature level can be obtained in both the first and third evaporators 14 and 24.

The refrigerant flowing from the main refrigerant circulating path 15 into the first branch passage 17 passes the opened electromagnetic valve 19, and then is decompressed in the throttle mechanism 20. Low pressure refrigerant after being decompressed in the throttle mechanism 20 flows into the second evaporator 21, and is evaporated in the second evaporator 21 by absorbing heat from air blown into the refrigerator by the second blower 22. Therefore, cooling function of the refrigerator can be obtained by the second evaporator 21. Gas refrigerant evaporated in the second evaporator 21 is drawn into the refrigerant suction port 13c of the ejector 13.

The refrigerant evaporation pressure of the first evaporator 14 corresponds to the pressure after pressure-increased in the diffuser portion 13b. In contrast, because the refrigerant outlet side of the second evaporator 21 is coupled to the refrigerant suction port 13c of the ejector 13, a reduced pressure immediately after decompressed at the nozzle portion 13a is applied to the second evaporator 21.

Accordingly, the refrigerant evaporation pressure of the second evaporator 21 can be made lower than the refrigerant evaporation pressure of the first evaporator 14 and the third evaporator 24. Therefore, the refrigerant evaporation temperature of the second evaporator 21 can be made lower than the refrigerant evaporation temperature of the first evaporator 14 and the third evaporator 24. Thus, a cooling function in a relatively low temperature range suitable to the cooling operation in the refrigerator can be obtained, while a cooling function in a relatively high temperature range suitable to the cooling operation of the passenger compartment can be obtained by the first evaporator 14 and the third evaporator 24.

When the cooling operation for cooling the refrigerator is unnecessary, the refrigerator switch of the air conditioning operation panel is turned off by the passenger. In this case, electrical power supplied to the electromagnetic valve 19 is stopped by the control device 26, and the electromagnetic valve 19 is closed. With this operation, the operation of the second blower 22 is stopped by the control device 26.

The refrigerant flowing into the first branch passage 17 is shut because the electromagnetic valve 19 is closed. In this case, refrigerant flows through the main refrigerant circulating path 15 and the second branch passage 18, and cooling function for cooling the passenger compartment can be obtained by the first evaporator 14 and the second evaporator 24.

When the refrigerant flow of the first branch passage 17 is shut, refrigerant is not drawn into the refrigerant suction port 13c of the ejector 13. In this case, because the density of the lubrication oil contained in the refrigerant becomes larger in a downstream space of the nozzle portion 13a within the ejector 13, the lubrication oil tends to collect at a lower portion within the ejector 13 at the downstream side of the nozzle portion 13a.

Figure 3:
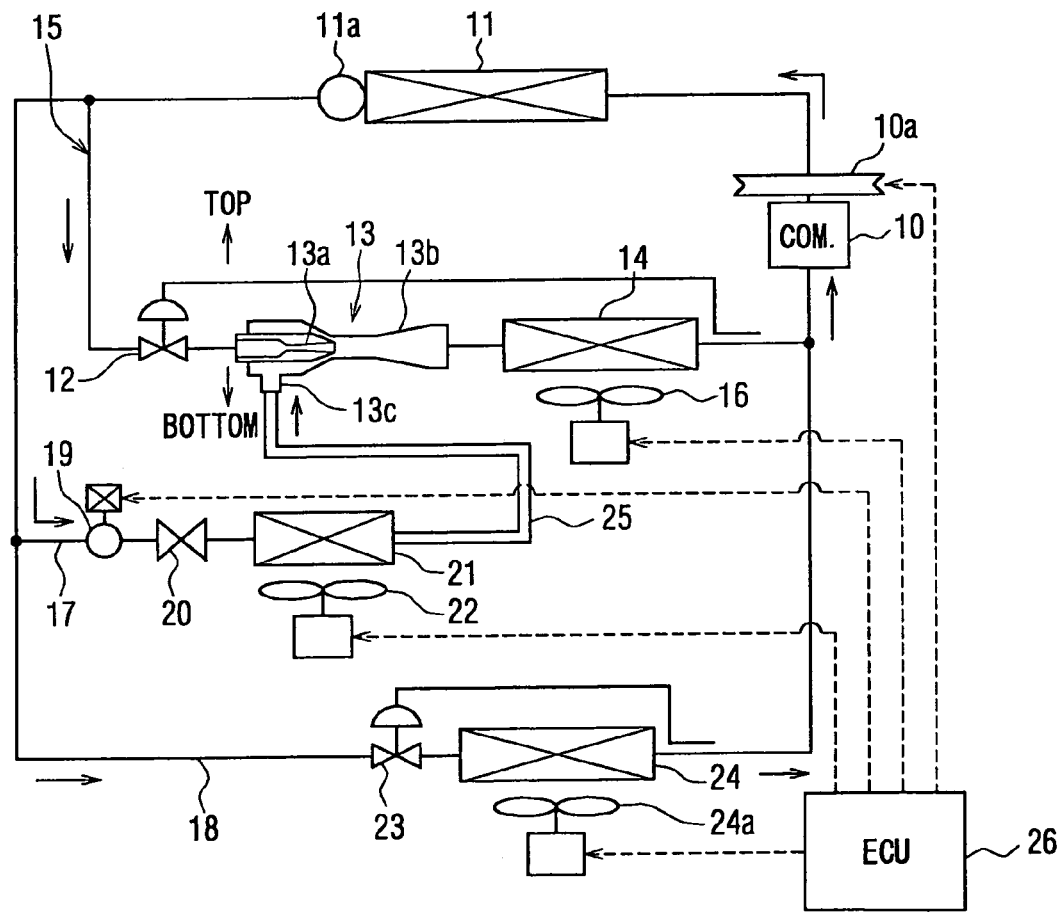
FIG. 3 is a cross-sectional view showing a vapor-compression refrigerant cycle system having an ejector in a comparison example.

FIG. 3 is a comparison example in which the refrigerant suction port 13c connected to the second evaporator 21 is positioned at a bottom side of the ejector 13 and the refrigerant suction pipe 25 is connected to the refrigerant suction port 13c under the ejector 13. In this case, the lubrication oil falls into the refrigerant suction port 13c by its weight, and stays in the refrigerant suction pipe 25.

In contrast, in the first embodiment, the refrigerant suction port 13c of the ejector 13 is located at the upper portion (e.g., the top portion in FIG. 2) of the housing 13d of the ejector 13, and the extending portion vertically extended by the predetermined height H is provided in the refrigerant suction pipe 25. Therefore, it can prevent the lubrication oil contained in the refrigerant from falling into the refrigerant suction port 13c, at a downstream area of the nozzle portion 13a within the ejector 13.

Accordingly, the lubrication oil is prevented from staying in the refrigerant suction pipe 25 when the electromagnetic valve 19 is closed. As a result, a shortage of the lubrication oil in the compressor 10 can be prevented.

In the above-described embodiment, the refrigerant suction port 13c is arranged at the top portion of the housing 13d of the ejector 13. However, the refrigerant suction port 13c of the ejector 13 can be arranged at the positions "a" and "b" shown by the chain line in FIG. 2, lower than the top portion and higher than the center portion. In this case, the refrigerant suction pipe 25 can be connected to the refrigerant suction port 13c in a slant state as shown in FIG. 2. Even in this case, it can prevent the lubrication oil from falling into the refrigerant suction port 13c, and thereby preventing the lubrication oil from staying in the refrigerant suction pipe 25.

Furthermore, the refrigerant suction port 13c can be arranged at an upper portion of the housing 13d of the ejector 13 in the range "c" (the upper side range of 180°) shown in FIG. 2.

Second Embodiment

Figure 4:
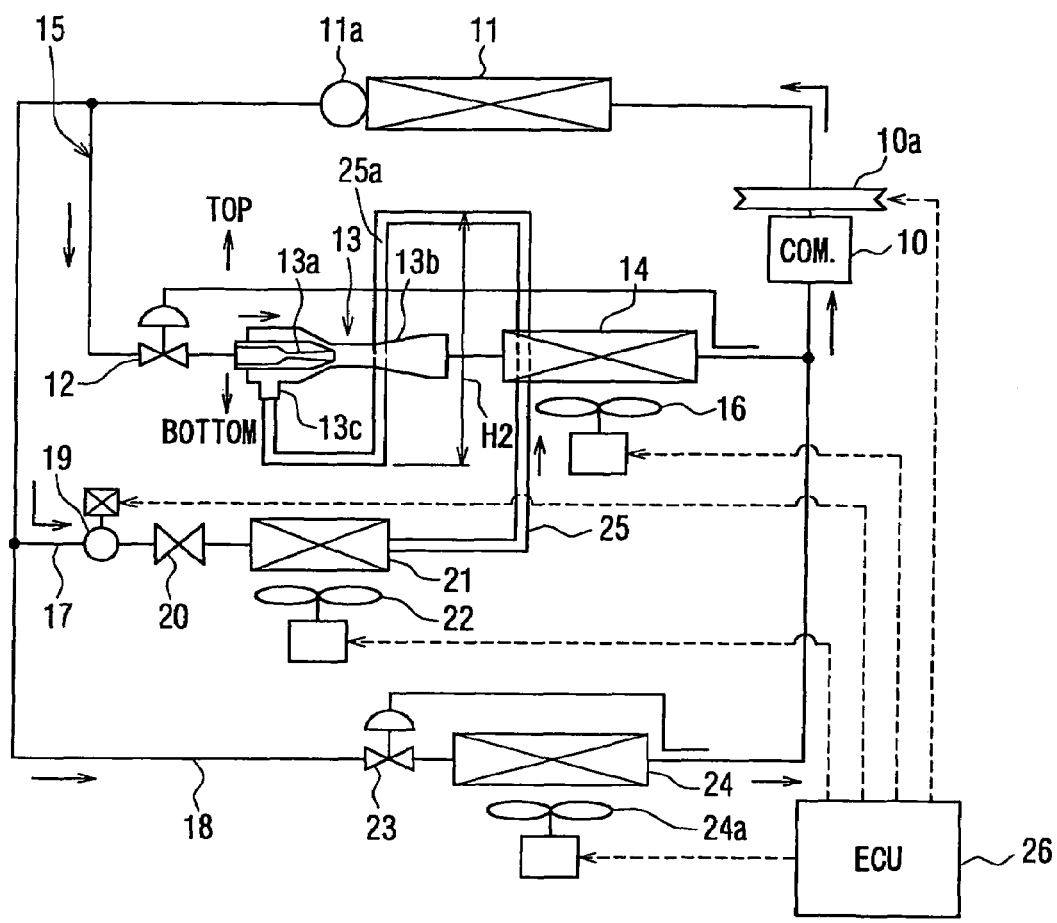
FIG. 4 is a schematic diagram showing a vapor-compression refrigerant cycle system having an ejector, according to a second embodiment of the present invention.

In the above-described first embodiment, the refrigerant suction port 13c of the ejector 13 is provided at an upper portion of the housing 13d. However, in the second embodiment, the refrigerant suction port 13c is provided at a lower portion of the housing 13d, and a standing portion 25a extending in a vertical direction is formed at a downstream portion in the refrigerant suction pipe 25, as shown in FIG. 4. The standing portion 25a can be vertically extended upwardly from a lowest portion of the ejector 13 by a predetermined height. In FIG. 4, H2 indicates the height of the standing portion 25a vertically extended.

In this embodiment, a downstream pipe portion downstream from the standing portion 25a in the refrigerant suction pipe 25 can be made shorter. Accordingly, even when the refrigerant suction portion 13c is arranged at the lower portion (e.g., bottom portion) of the housing 13d, the lubrication amount staying in the refrigerant suction pipe 25 can be controlled at a little amount.

In FIG. 4, the standing portion 25a and the upstream portion upstream from the standing portion 25a are vertically bent, however, may be bent in a circular arc shape. Further, the height of the standing portion 25a can be changed only when the top portion of the standing portion 25a is higher than the refrigerant suction port 13c. Furthermore, when the top portion of the standing portion 25a is set higher than a center portion of the ejector 13, the lubrication amount staying in the refrigerant suction pipe 25 can be effectively reduced.

In the second embodiment, the other parts may be made similar to those of the above-described first embodiment.

Third Embodiment

Figure 5:
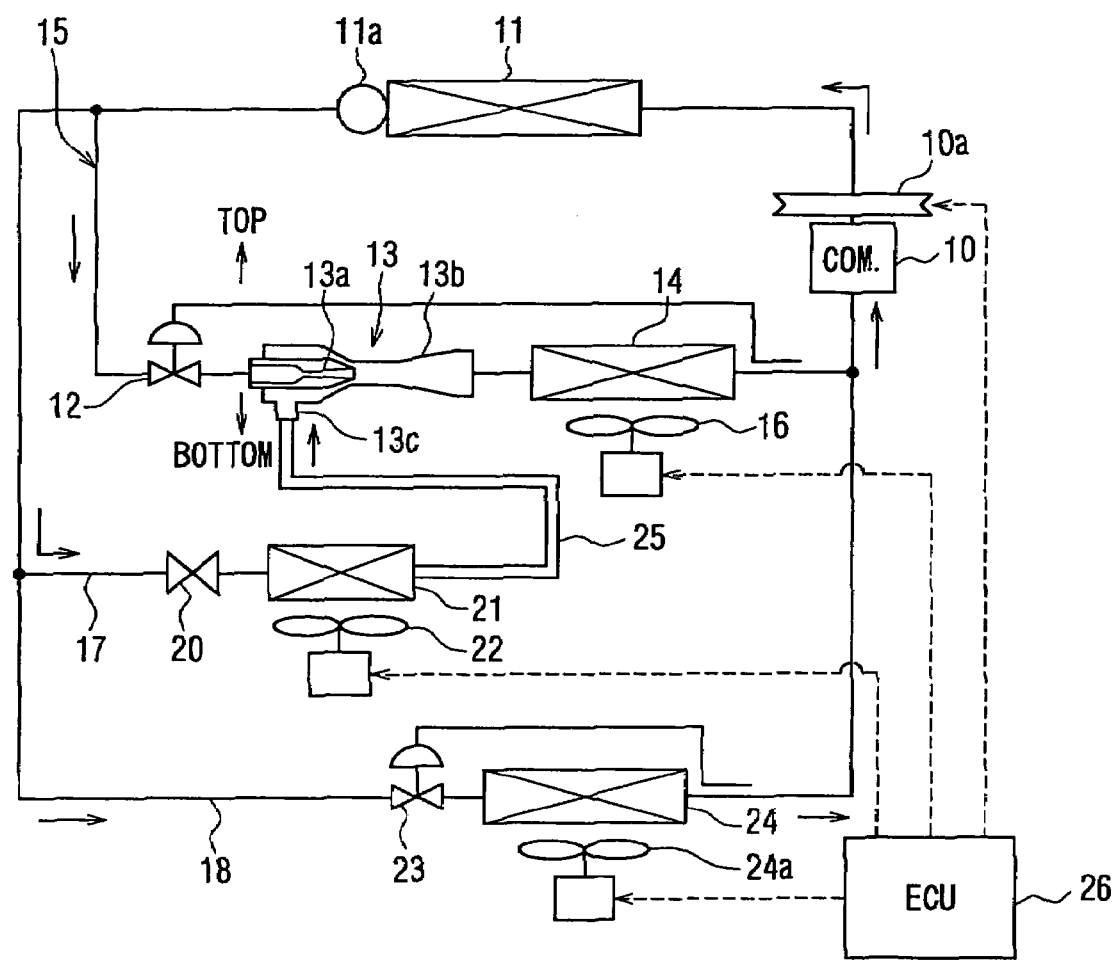
FIG. 5 is a schematic diagram showing a vapor-compression refrigerant cycle system having an ejector, according to a third embodiment of the present invention.

FIG. 5 shows a vapor-compression refrigerant cycle system of the third embodiment. In the third embodiment, the electromagnetic valve 19 is not provided in the first branch passage 17, and refrigerant flowing from the main refrigerant circulating path 15 flows into the second evaporator 21 in the first branch portion 17 after passing through the throttle mechanism 20. Therefore, when the compressor 10 is operated, refrigerant always flows into the second evaporator 21 in the first branch passage 17.

Thus, in this embodiment, when the refrigerator function (refrigerator cooling operation) is stopped, the operation of the second blower 22 is stopped. When the second blower 22 is stopped, a heat absorbing amount of the refrigerant in the second evaporator 2 is very small, and a large amount of the liquid refrigerant having passed through the throttle mechanism 20 is drawn into the refrigerant suction port of the ejector 13 without being evaporated in the second evaporator 21.

In the third embodiment, a refrigerant suction stream from the refrigerant suction pipe 25 to the refrigerant suction port 13c is always formed when the compressor 10 operates. Accordingly, even when the refrigerant suction port 13c is arranged at a lower portion (e.g., bottom portion), the lubrication oil does not fall into the refrigerant suction port 13c by its weight.

In the third embodiment, the other parts may be set similar to those of the above-described first embodiment. Further, even in the third embodiment, the refrigerant suction port 13c can be arranged at an upper portion of the housing 13d of the ejector 13.

Fourth Embodiment

Figure 6:
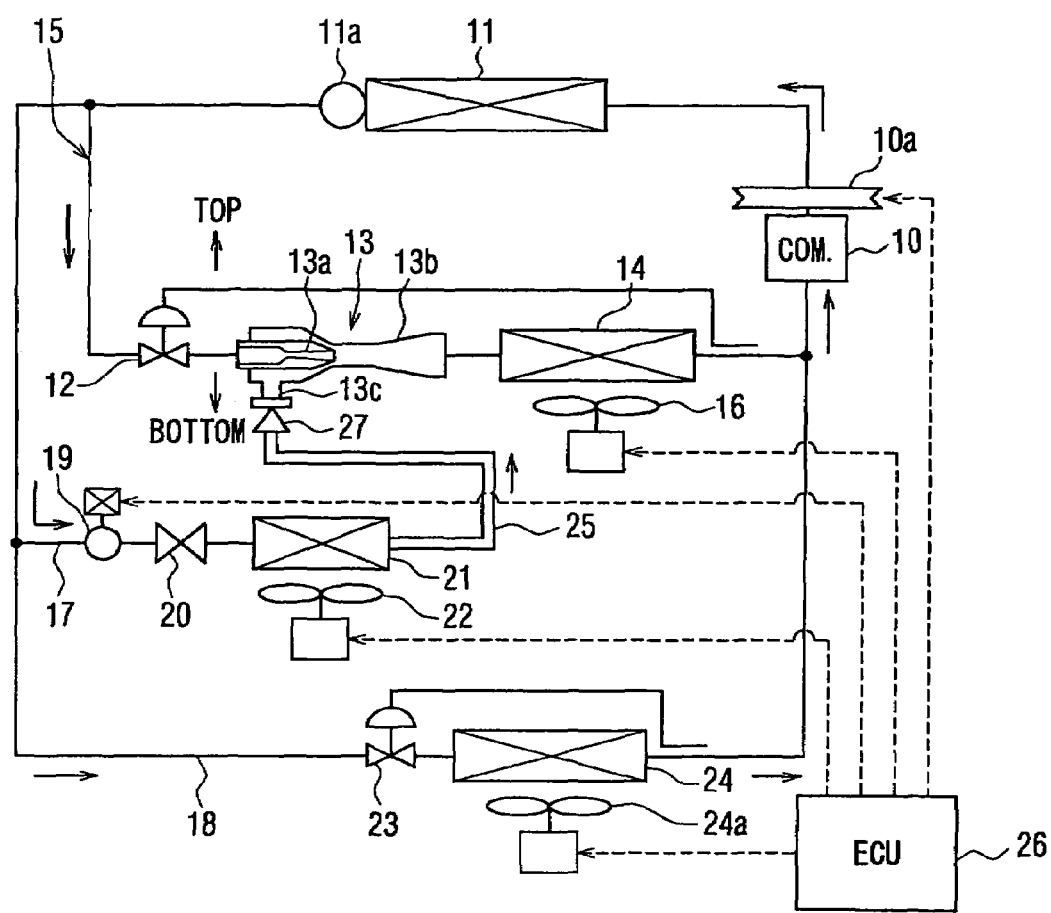
FIG. 6 is a schematic diagram showing a vapor-compression refrigerant cycle system having an ejector, according to a fourth embodiment of the present invention.

FIG. 6 shows a vapor-compression refrigerant cycle system of the fourth embodiment. In the vapor-compression refrigerant cycle system, the refrigerant suction port 13c is provided at a lower portion (e.g., bottom portion) of the ejector 13, and a check valve 27 is provided at an inlet portion of the refrigerant suction port 13c. That is, the check valve 27, which only allows one direction refrigerant flow from refrigerant suction pipe 25 to the refrigerant suction port 13c, is located at a downstream end portion of the refrigerant suction pipe 25. Therefore, the check valve 27 prevents a reverse flow of the refrigerant and the lubrication oil from the refrigerant suction port 13c to the refrigerant suction pipe 25.

Accordingly, the check valve 27 prevents the lubrication oil from staying in the refrigerant suction pipe 25 when the electromagnetic valve 19 closes. That is, when the refrigerator function (refrigerator cooling operation) is stopped, the check valve 27 prevents the lubrication oil from flowing into the refrigerant suction pipe 25 from the refrigerant suction port 13c even when the refrigerant suction port 13c is provided at the bottom portion of the housing 13d.

In the fourth embodiment, the other parts can be made similar to those of the above-described first embodiment.

Fifth Embodiment

Figure 7:
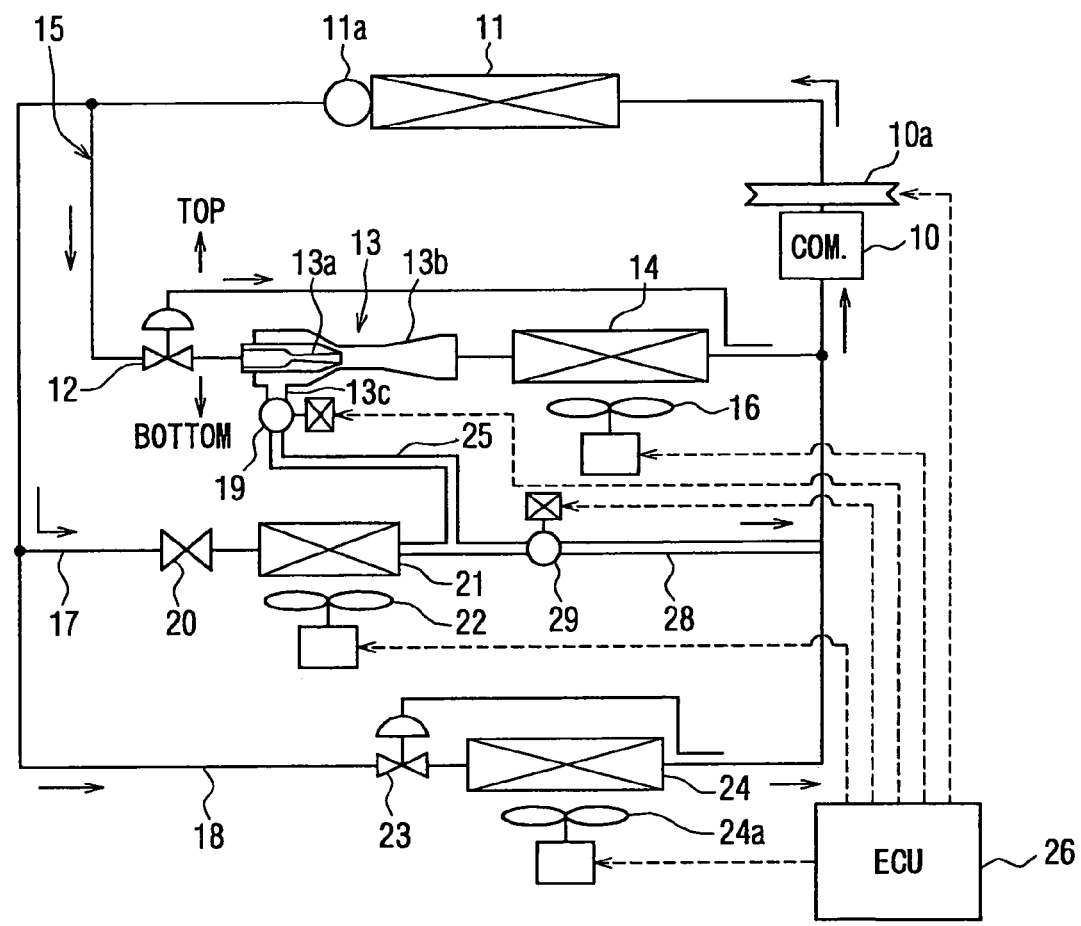
FIG. 7 is a schematic diagram showing a vapor-compression refrigerant cycle system having an ejector, according to a fifth embodiment of the present invention.

FIG. 7 shows a vapor-compression refrigerant cycle system of the fifth embodiment. In the above-described first embodiment, the electromagnetic valve 19 is provided at an upstream side of the throttle mechanism 20 in the first branch passage 17. In this fifth embodiment, the refrigerant suction port 13c is provided at a lower portion (e.g., bottom portion) of the housing 13d, and the electromagnetic valve 19 is located at an inlet portion of the refrigerant suction port 13c. That is, the electromagnetic valve 19 is located at a downstream end portion of the refrigerant suction pipe 25. Furthermore, a bypass passage 28 connected to the suction side of the compressor 10 is connected to the first branch passage 17 at a downstream side of the second evaporator 21. An auxiliary electromagnetic valve 29 operatively linked with the electromagnetic valve 19 is located in the bypass passage 28.

In the fifth embodiment, when the switch of the refrigerator is turned off and a refrigerator stopping state is set, the electromagnetic valve 19 is closed by the control output of the control device 26, and the auxiliary electromagnetic valve 29 is opened. Furthermore, the operation of the second blower 22 is stopped by the control output of the control device 26.

Because the electromagnet valve 19 located at the inlet portion of the refrigerant suction port 13c is closed, it can prevent the lubrication oil from staying in the refrigerant suction pipe 25 even when the refrigerant suction port 13c is provided at the lower portion of the ejector 13. Furthermore, because the refrigerant introduced into the first branch passage 17 flows toward the suction side of the compressor 10 through the bypass passage 28, it can prevent the lubrication oil from staying in the second evaporator 21 when the electromagnetic valve 19 is closed.

In the fifth embodiment, when the switch of the refrigerator is turned on and the refrigerator is operated, the electromagnetic valve 19 is opened, the auxiliary electromagnetic valve 29 is closed, and the second blower 22 is operated by control output of the control device 26.

Sixth Embodiment

Figure 8:
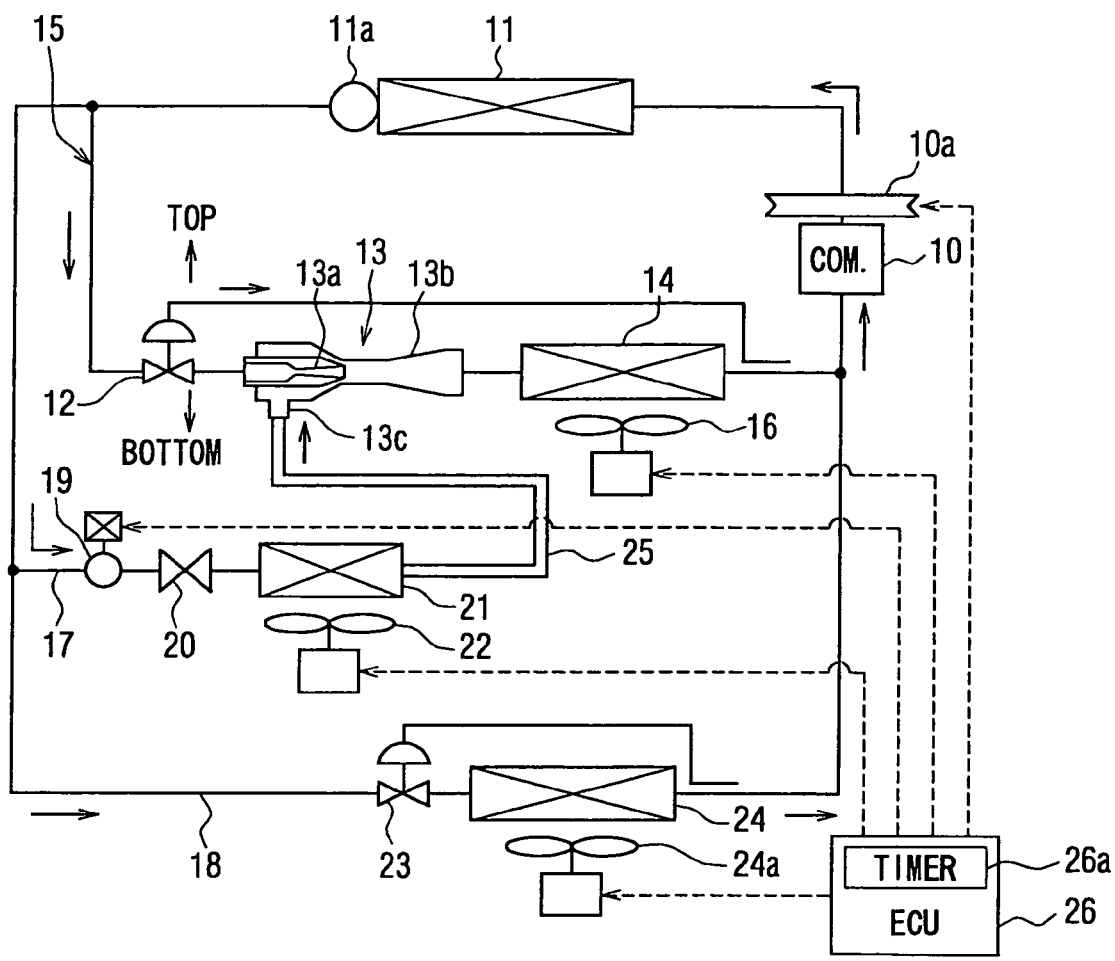
FIG. 8 is a schematic diagram showing a vapor-compression refrigerant cycle system having an ejector, according to a sixth embodiment of the present invention.

FIG. 8 shows a vapor-compression refrigerant cycle system of the sixth embodiment. In the sixth embodiment, the refrigerant suction port 13c is provided at the lower portion of the ejector 13, and the refrigerant suction pipe 25 is connected to the refrigerant suction portion 13 at the bottom side of the ejector 13, similarly to the comparison example of FIG. 3.

In the sixth embodiment, the turning on and off operation of the electromagnetic valve 19 is controlled in the refrigerator stop state. Specifically, a timer 26a is provided in the control device 26. The function of the timer 26a is started, when the refrigerator switch of the air conditioning panel is turned off and the refrigerator stop state is set while the compressor 10 operates.

The function of the timer 26a will be described with reference to FIG. 9. The abscissa of FIG. 9 indicates an elapsed time after the refrigerator stop state is set. When a predetermined time t1 passes after the refrigerator stop state is set, that is, after a closing state of the electromagnetic valve 19 is continued for the predetermined time, the electromagnetic valve 19 is forcibly switched (opened and closed) by a predetermined number based on a signal from the timer 26a of the control device 26.

That is, the operation of the electromagnetic valve 19 is controlled by the timer 26a of the control device 26, such that the open state of the electromagnetic valve 19 performed for a first predetermined time "ton" and the close state of the electromagnetic valve 19 performed for a second predetermined time "off" are repeated alternately by predetermined times. In this case, refrigerant can flows into the first branch passage 17 intermittently, and lubrication oil staying in the refrigerant suction pipe 25 can be sent to the refrigerant suction port 13c of the ejector 13.

Figure 10:
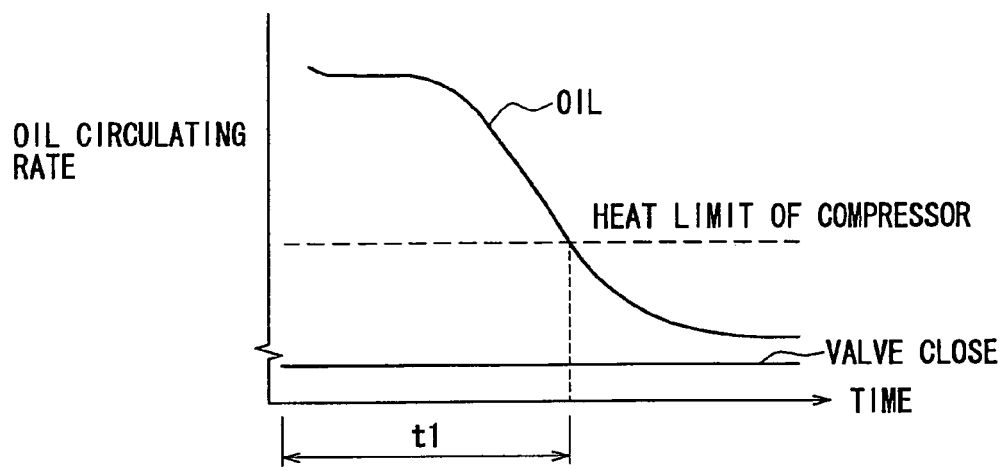
FIG. 10 is a graph showing a relationship between an elapsed time after an electromagnetic valve is closed, and a circulation rate of lubrication oil.

FIG. 10 shows a case where the electromagnetic valve 19 is closed during the refrigerator stop state. The abscissa of FIG. 10 indicates an elapsed time after the refrigerator stop state is set. When the electromagnetic valve 19 is closed, the lubrication amount staying in the refrigerant suction pipe 25 is increased as the elapsed time becomes longer. Therefore, a circulating rate R1 (oil circulating rate) of the lubrication oil drawn into the compressor 10 becomes decreased. The oil circulating rate R1 can be calculated by the following formula.

$$R1 = A1/(A1+A2) \times 100 \, (\%)$$

Wherein A1 shows a lubrication oil amount returning to the compressor 10, and A2 shows a refrigerant amount returning to the compressor 10.

As shown in FIG. 10, after the time t1 elapses after the electromagnetic valve 19 is closed, the oil shortage of the compressor 10 is caused. Therefore, the temperature of the compressor 10 is increased to a limit temperature, and the compressor 10 becomes a maximum hot state (heat limit).

Figure 9:
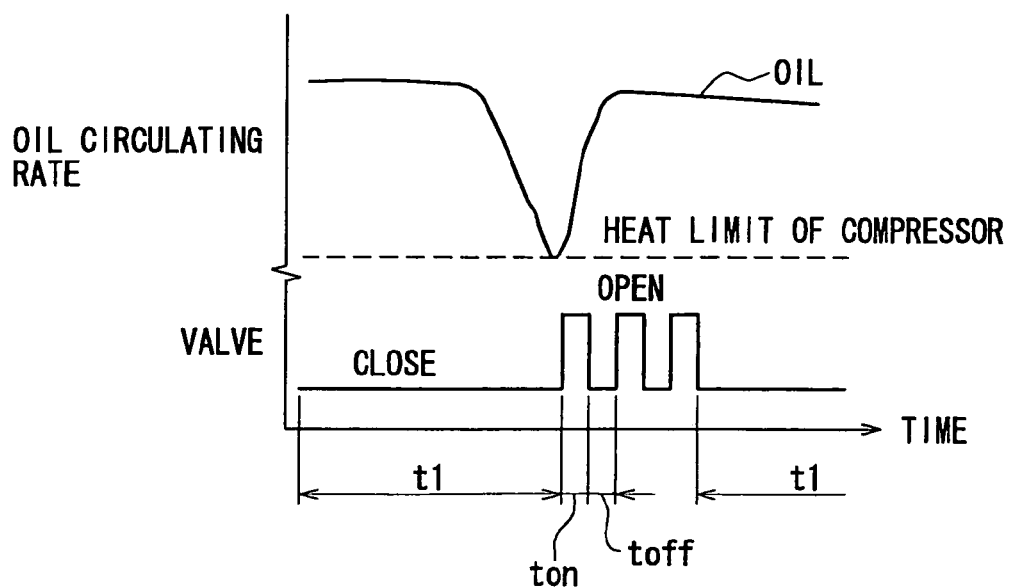
FIG. 9 is a graph showing operation of the vapor-compression refrigerant cycle system in the sixth embodiment.

Accordingly, in the sixth embodiment, after the predetermined time t1 passes after the electromagnetic valve 19 is closed, the opening and closing of the electromagnetic valve 19 are alternately repeated by the predetermined time, as shown in FIG. 9. In this case, the oil circulating ratio can be increased to a necessary level, and a shortage of the lubrication oil in the compressor 10 can be prevented.

In FIG. 9, the repeat of the forcibly opening of the electromagnetic valve 19 is set at three times. However, the repeat can be set at plural times more than one time.

Seventh Embodiment

Figure 11:
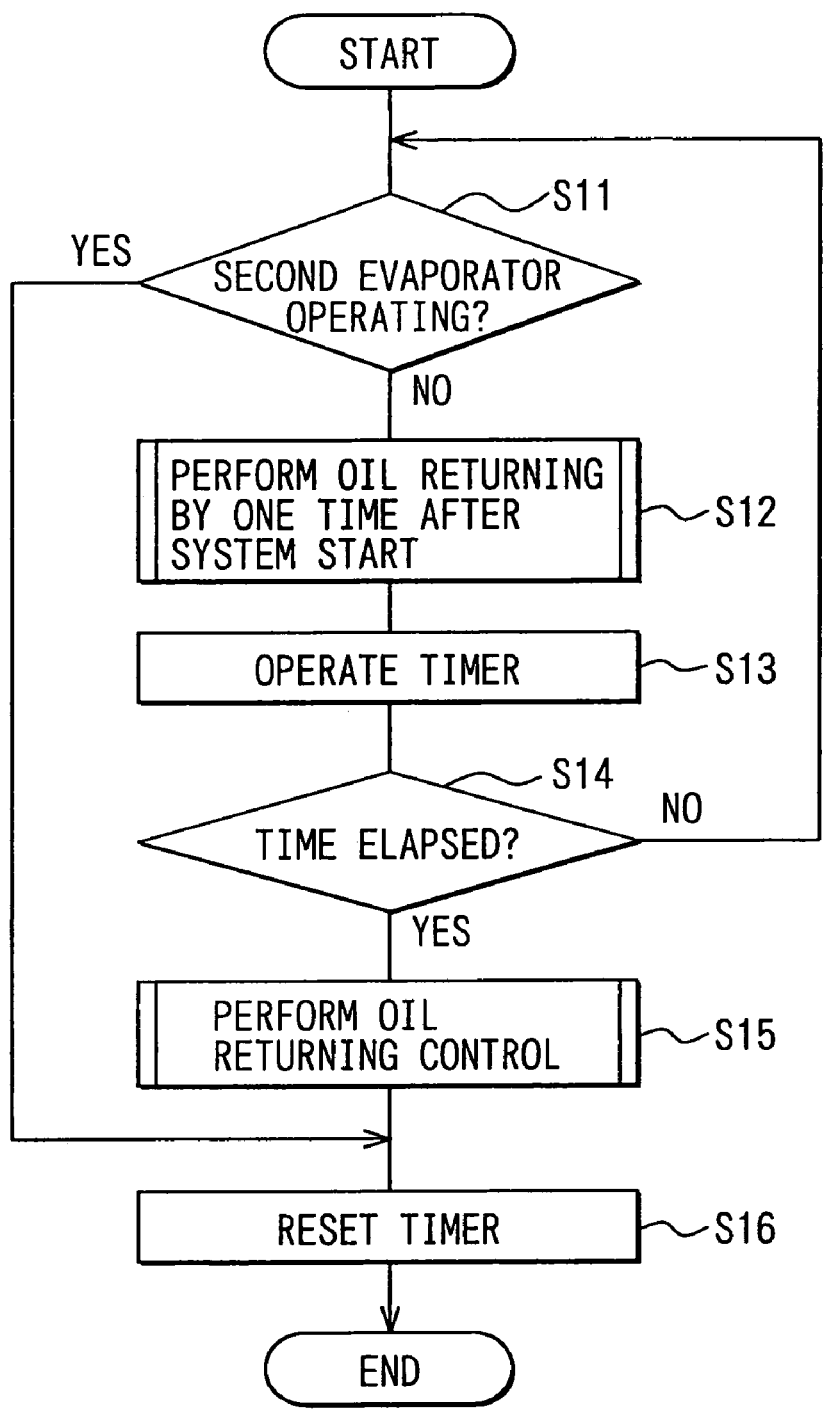
FIG. 11 is a flow diagram showing a control operation of a control device in a seventh embodiment.

The seventh embodiment of the present invention will be now described with reference to FIG. 11. FIG. 11 shows a control operation of the control device 26 according to a modification of the sixth embodiment. In the seventh embodiment, the operation of step S12 is added in the control operation of the sixth embodiment. That is, the other steps except for step S12 can be performed similar to the control operation of the above-described sixth embodiment.

The control operation of the seventh embodiment will be now described. First, at step S1, it is determined whether a cooling operation of the second evaporator 21 is performed. When the cooling operation of the second evaporator 21 is not performed, the operation at step S12 is performed.

At step S12, an oil returning control is performed by only one time after the vapor-compression refrigerant cycle system (compressor 10) is operated. During the oil returning control, the electromagnetic valve 19 used as a switching valve is opened for a predetermined time. After the oil returning control is performed, the electromagnetic valve 19 is closed, and at the same time, the control program moves to step S13. For example, in the vapor-compression refrigerant cycle system shown in FIG. 8, even when the cooling function of the second evaporator 21 is stopped at a time where the vapor-compression refrigerant cycle system starts, the lubrication oil staying in the second evaporator 21 and the refrigerant pipes at the side of the second evaporator 21 can be drawn into the refrigerant suction port 13c, and can be returned to the suction side of the compressor 10.

Next, at step S13, the timer 26a of the control device 26, described in the sixth embodiment, is operated. Then, at step S14, it is determined whether a predetermined time elapses after the timer 26a is set.

After the predetermined time elapses at step S14, the oil returning control is performed for a predetermined time period at step S15. That is, the electromagnetic valve 19 is opened for the predetermined time period during the oil retuning control. After the electromagnetic valve 19 is opened for the predetermined time period, the electromagnetic valve 19 is closed and the control program processes to step S15.

At step S16, the timer 26a is reset so that the control program shown in FIG. 11 can be repeated.

According to the seventh embodiment, when the cooling function of the second evaporator 21 is stopped when the vapor-compression refrigerant cycle system starts, the electromagnetic valve 19 is opened for a predetermined time period. Therefore, even when the cooling function of the second evaporator 21 is not performed at a time where the vapor-compression refrigerant cycle system starts, the lubrication oil staying in the second evaporator 21 and the refrigerant pipes at the side of the second evaporator 21 can be drawn into the refrigerant suction port 13c once, and can be returned to the suction side of the compressor 10.

Accordingly, a shortage of the oil amount returning to the compressor 10 can be prevented when the cooling function of the second evaporator 21 stops, and the compressor 10 can be stably and effectively operated. After the oil retuning operation is performed by one time, the electromagnetic valve 19 is forcibly opened after the closing state of the electromagnetic valve 19 is continued for a time period, similarly to the sixth embodiment.

Eighth Embodiment

Figure 12:
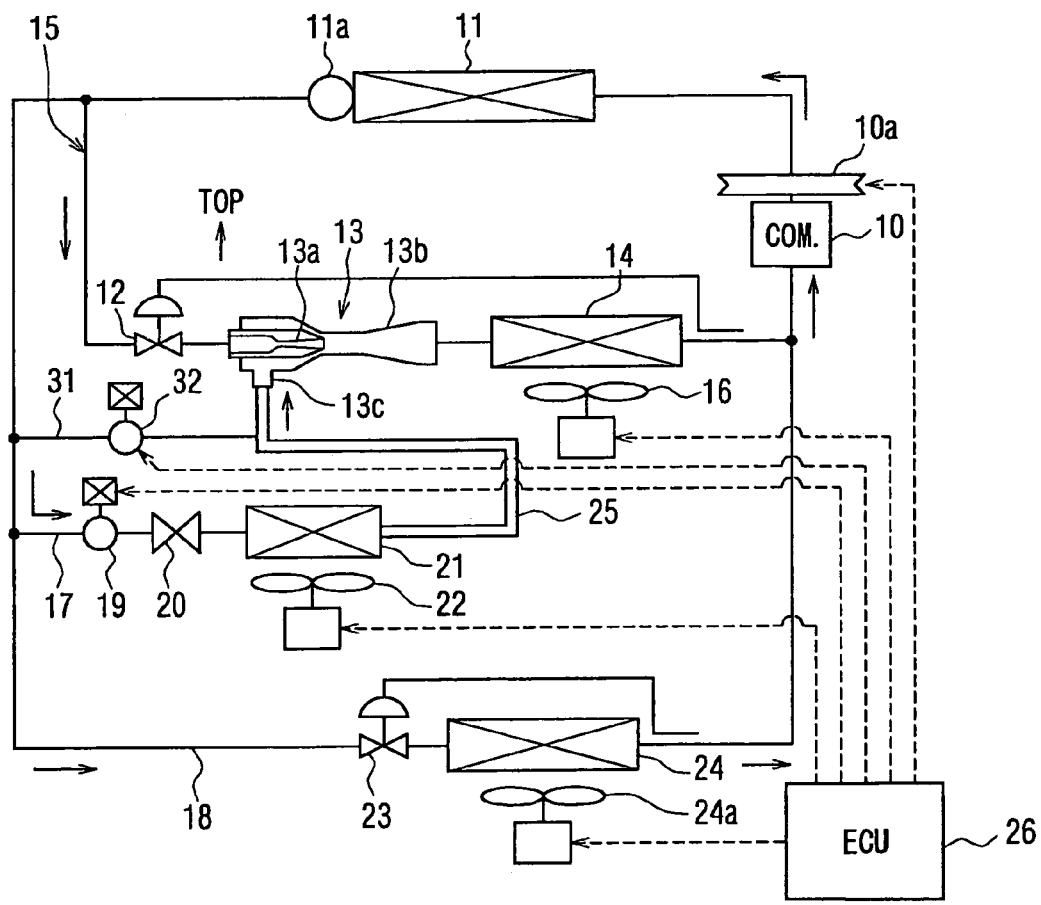
FIG. 12 is a schematic diagram showing a vapor-compression refrigerant cycle system having an ejector, according to an eighth embodiment of the present invention.

FIG. 12 shows a vapor-compression refrigerant cycle system of the eighth embodiment. In the vapor-compression refrigerant cycle system shown in FIG. 12, a bypass passage 31 and an auxiliary electromagnetic valve 32 for opening and closing the bypass passage 31 are provided additionally, as compared with the structure of the comparison example of FIG. 3. Through the bypass passage 31, refrigerant from the main refrigerant circulating path 15 flows into the refrigerant suction port 13c while bypassing the electromagnetic valve 19 and the second evaporator 21.

In the eighth embodiment, when the cooling operation of the second evaporator 21 is not performed, the auxiliary electromagnetic valve 32 is opened so that refrigerant flows through the bypass passage 31 by a predetermined amount. The electromagnetic valve 19 and the auxiliary electromagnetic valve 32 are controlled by the control device 26. The flow amount of the refrigerant in the bypass passage 31 is set to only prevent the lubrication oil from falling into the refrigerant suction port 13c due to the weight of the lubrication oil. Therefore, the flow amount of the refrigerant in the bypass passage 31 can be set small, and a capillary tube can be used as the bypass passage 31.

According to the eighth embodiment, when the cooling operation of the second evaporator 21 is stopped by closing the electromagnetic valve 19, refrigerant flows through the bypass passage 31 by a predetermined flow amount. Therefore, refrigerant always flows into the refrigerant suction port 13c of the ejector 13 from the bypass passage 31, thereby preventing the lubrication oil from falling into the refrigerant suction port 13c by its weight.

As a result, it can prevent the returning amount of the lubrication oil to the compressor 10 from being insufficient when the cooling operation of the second evaporator 21 is stopped. Therefore, the lubricating property of the compressor 10 can be effectively maintained.

Ninth Embodiment

Figure 13:
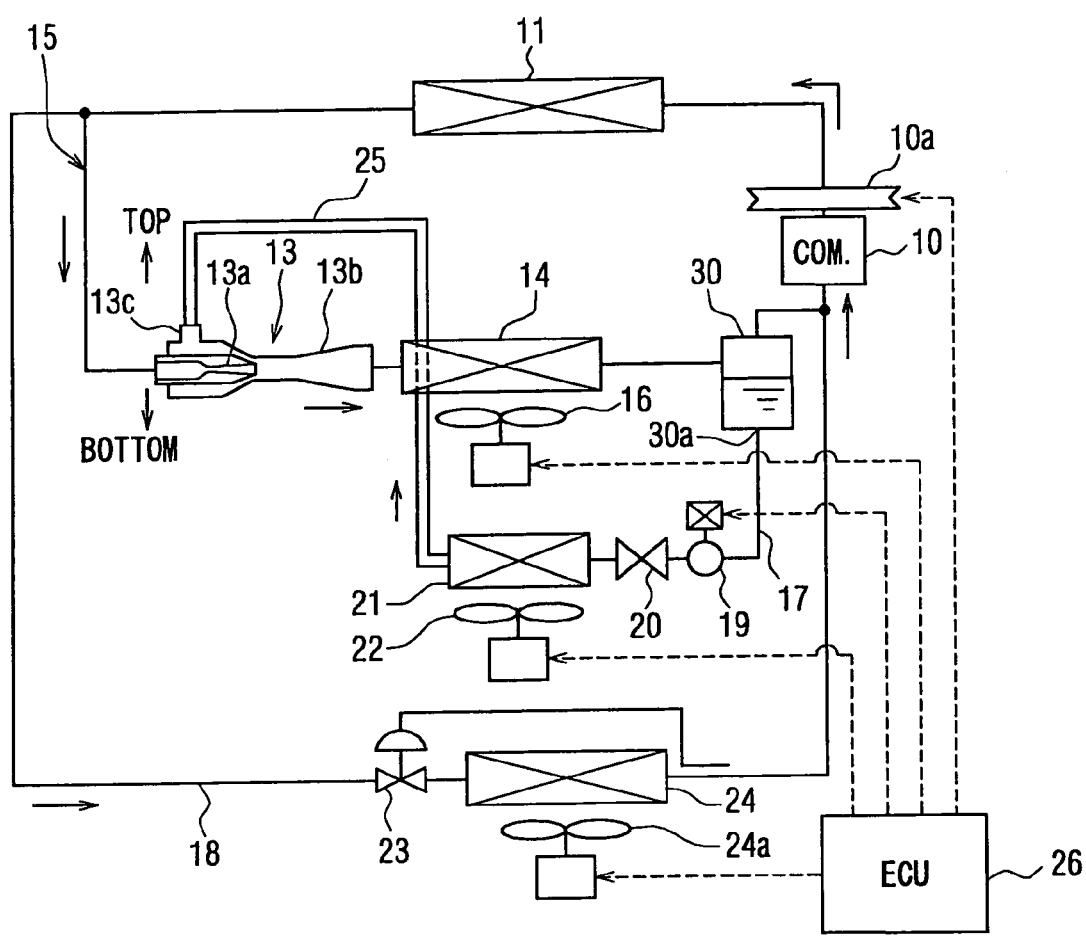
FIG. 13 is a schematic diagram showing a vapor-compression refrigerant cycle system having an ejector, according to a ninth embodiment of the present invention.

In the above-described first to eighth embodiments, the first branch passage 17, through which the downstream side of the refrigerant radiator 11 is connected to the refrigerant suction port 13c of the ejector 13, is provided. Furthermore, the electromagnetic valve 19, the throttle mechanism 20 and the second evaporator 21 are arranged in the first branch passage 17 in serious. In the ninth embodiment, the arrangement structure of the first branch passage 17 is changed as shown in FIG. 13.

In the ninth embodiment, a gas-liquid separator 30 is arranged at a downstream side of the first evaporator 14, and the refrigerant flowing out of the first evaporator 14 is separated in a gas-liquid separator 30. The liquid refrigerant separated in the gas-liquid separator 30 is stored in the gas-liquid separator 30, and the gas refrigerant in the gas-liquid separator 30 is supplied to the suction side of the compressor 10.

Furthermore, a liquid refrigerant outlet 30a is provided at a lower portion of the gas-liquid separator 30, and the liquid refrigerant outlet 30a is connected to the refrigerant suction port 13c of the ejector 13 by using a first branch passage 17. In the first branch passage 17, the electromagnetic valve 19, the throttle mechanism 20 and the second evaporator 21 are arranged in serious in this order in a refrigerant flow direction of the first branch passage 17.

The refrigerant suction port 13c is provided at an upper portion of the ejector 13, similar to the above-described first embodiment. Further, the refrigerant suction port 25 has a standing portion vertically extending from the refrigerant suction port 13c upwardly. Therefore, it can effectively prevent the lubrication oil from falling into the refrigerant suction port 13c by its weight.

In the ninth embodiment, the refrigerant evaporation pressure (refrigerant evaporation temperature) of the second evaporator 21 is lower than the refrigerant evaporation pressure (refrigerant evaporation temperature) of the first evaporator 14, as in the above-described first embodiment.

Further, in the ninth embodiment, the flow adjacent valve 12 and the gas-liquid separator 11a of the refrigerant radiator 11 of the above-described first to eighth embodiments are omitted. In this ninth embodiment, the gas-liquid separator 30 is arranged at a downstream side of the first evaporator 14, and the gas refrigerant separated in the gas-liquid separator 30 is sucked to the compressor 10.

Further, when the cooling operation of the second evaporator 21 is performed, the electromagnetic valve 19 is opened so that liquid refrigerant in the gas-liquid separator 30 is introduced into the second branch passage 17 from the liquid refrigerant outlet 30a. The liquid refrigerant from the liquid refrigerant outlet 30a of the gas-liquid separator 30 is decompressed in the throttle mechanism 20, and is evaporated in the second evaporator 21. The refrigerant from the second evaporator 21 is drawn into the ejector 13 from the refrigerant suction port 13c.

In the ninth embodiment, the changed structure of the first branch passage 17 and the gas-liquid separator 30 is used for and combined with the vapor-compression refrigerant cycle system of the first embodiment. However, this changed structure can be used for the vapor-compression refrigerant cycle system according to one of the second through eighth embodiments.

Other Embodiments

Although the present invention has been described in connection with some preferred embodiments thereof with reference to the accompanying drawings, it is to be noted that various changes and modifications will become apparent to those skilled in the art.

For example, in the above-described first to ninth embodiments, the first evaporator 14 is used for cooling the front seat area of the passenger compartment, the third evaporator 24 is used for cooling the rear seat area of the passenger compartment, and the second evaporator 21 is used for performing the cooling operation of a refrigerator. However, in the above-described embodiments, the third evaporator 24 and a refrigerant passage structure for the third evaporator 24 can be omitted. For example, the present invention can be applied to a vapor-compression refrigerant cycle system without the third evaporator 24 as shown in FIG. 14.

Figure 14:
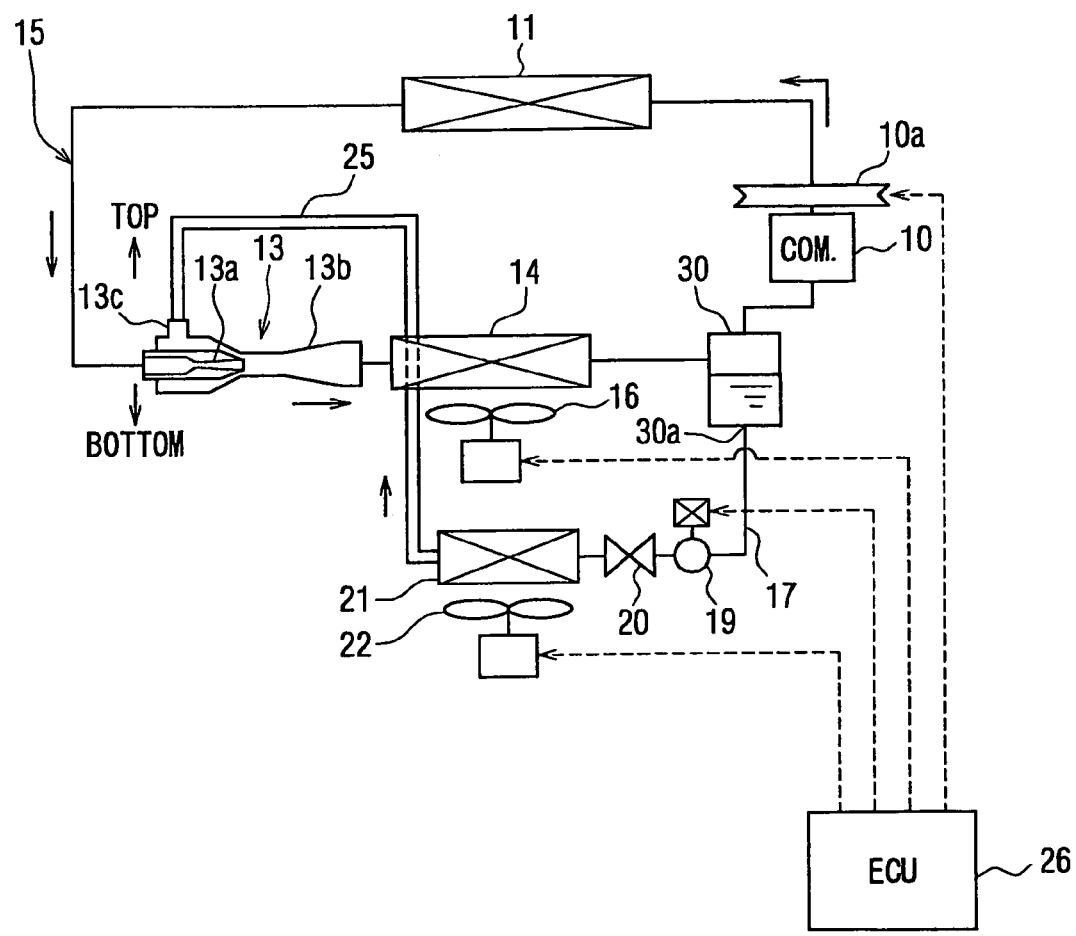
FIG. 14 is a schematic diagram showing a vapor-compression refrigerant cycle system having an ejector, according to a modification of the present invention.

In this example shown in FIG. 14, the third evaporator 24 is omitted in the system structure of the ninth embodiment.

However, the third evaporator 24 can be omitted in the vapor-compression cycle system according to one of the first to eighth embodiments.

In the above-described first to ninth embodiments, the second evaporator 21 is used for the cooling operation of a refrigerator mounted on a vehicle. However, the first and second evaporators 14 and 21 can be used for performing air conditioning operation for different areas in the passenger compartment of the vehicle. For example, in a case where the third evaporator 24 is not provided, the first evaporator 14 and the second evaporator 21 can be used for performing air conditioning in the front seat area and the rear seat area within the passenger compartment.

Alternatively, both the first evaporator 14 and the second evaporator 21 can be used for performing the cooling operation of a refrigerator. In this case, the first evaporator 14, in which the refrigerant evaporation temperature is relatively high, can be used for a cooling chamber of the refrigerator, and the second evaporator 21, in which the refrigerant evaporation temperature is relatively low, can be used for a freezing chamber of the refrigerator.

In the above-described embodiments, any refrigerant generally used in a vapor-compression refrigerant cycle system can be used. For example, a Freon group refrigerant, an organic compound refrigerant, HC group refrigerant and carbon dioxide can be used as the refrigerant. Furthermore, the vapor-compression refrigerant cycle system can be used as a super-critical refrigerant cycle system having a pressure of a high-pressure side refrigerant higher than the critical pressure of the refrigerant or can be used as a refrigerant cycle system having a pressure of a high-pressure side refrigerant lower than the critical pressure of the refrigerant. Here, the organic compound refrigerant is a normally used refrigerant composed of carbon, fluorine, chlorine and hydrogen. The Freon group refrigerant is for example, hydro chloro fluoro carbon (HCFC) group refrigerant or hydro fluoro carbon (HFC) group refrigerant. Furthermore, as the carbon hydride (HC) group refrigerant, isobutene (R600a), propane (R290), etc. can be used.

In the above-described embodiments, a fixed displacement compressor can be used as the compressor 10. In this case, the compression operation of the compressor 10 is controlled by using the clutch 10a, and a discharge amount of the refrigerant from the compressor 10 is controlled by controlling the on/off operation of the compressor 10. Alternatively, a variable displacement compressor can be used as the compressor 10. In this case, the displacement of the compressor 10 is controlled by the control device 26, so that the refrigerant amount discharged from the compressor 10 can be controlled. Alternatively, an electrical compressor can be used as the compressor 10. In this case, by controlling the rotation speed of the electrical compressor 10, the refrigerant amount discharged from the compressor 10 can be controlled.

In the above-described embodiments, as the nozzle portion 13a, a variable nozzle can be used. In this case, a refrigerant flow area (e.g., throttle open degree) of the nozzle portion 13a can be changed.

In the above-described first to eighth embodiments, the flow adjustment valve 12 is arranged at the upstream portion of the ejector 13. However, when the flow amount of the refrigerant flowing in the first evaporator 14 is adjusted by the throttling operation of the ejector 13, the flow adjustment valve 12 can be omitted.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A vapor-compression refrigerant cycle system comprising
    a compressor which compresses refrigerant;
    a refrigerant radiator for cooling high-pressure refrigerant discharged from the compressor;
    an ejector which includes a nozzle for decompressing and expanding refrigerant from the refrigerant radiator, a refrigerant suction port from which gas refrigerant is drawn by a refrigerant steam jetted from the nozzle, and a pressure-increasing portion in which the refrigerant jetted from the nozzle and the gas refrigerant drawn from the refrigerant suction port are mixed and pressure of the refrigerant is increased by converting the speed energy to pressure energy;
    a first evaporator for evaporating refrigerant flowing out of the pressure-increasing portion of the ejector, the first evaporator being located at a downstream side of the ejector and having a refrigerant outlet coupled to a suction side of the compressor;
    a second evaporator for evaporating refrigerant to be drawn into the refrigerant suction port;
    a valve member for opening and closing a refrigerant passage of the second evaporator, the valve member being arranged in serious with the second evaporator in a refrigerant flow;
    a refrigerant suction pipe having a first end connected to a refrigerant outlet of the second evaporator and a second end connected to the refrigerant suction port; and
    means for restricting lubrication oil contained in refrigerant from being introduced into and staying in the refrigerant suction pipe through the refrigerant suction port when the valve member is closed.

2. The vapor-compression refrigerant cycle system according to claim 1, wherein the refrigerant suction port is provided at an upper side of the ejector, as the means.

3. The vapor-compression refrigerant cycle system according to claim 1, wherein the refrigerant suction pipe has a standing portion as the means at a downstream position, and the standing portion extends upwardly to a position higher than the refrigerant suction port.

4. The vapor-compression refrigerant cycle system according to claim 1, wherein the means is a check valve located at an inlet portion of the refrigerant suction port to only allow a refrigerant flow from the refrigerant suction pipe into the refrigerant suction port.

5. The vapor-compression refrigerant cycle system according to claim 1, further comprising
    an auxiliary valve member arranged in a refrigerant passage through which refrigerant from the second evaporator is introduced to the refrigerant suction port of the compressor, wherein:
    the valve member is located at an inlet portion of the refrigerant suction port;
    the auxiliary valve member is opened when the valve member is closed, so that the refrigerant flowing out of the second evaporator flows into the suction side of the compressor; and the means is constructed with the valve member and the auxiliary valve member.

6. A vapor-compression refrigerant cycle system comprising a compressor which compresses refrigerant;

a refrigerant radiator for cooling high-pressure refrigerant discharged from the compressor;

an ejector which includes a nozzle for decompressing and expanding refrigerant from the refrigerant radiator, a refrigerant suction port from which gas refrigerant is drawn by a refrigerant steam jetted from the nozzle, and a pressure-increasing portion in which the refrigerant jetted from the nozzle and the gas refrigerant drawn from the refrigerant suction port are mixed and pressure of the refrigerant is increased by converting the speed energy to pressure energy;

a first evaporator for evaporating refrigerant flowing out of the pressure-increasing portion of the ejector, the first evaporator being located at a downstream side of the ejector and having a refrigerant outlet coupled to a suction side of the compressor;

a second evaporator for evaporating refrigerant to be drawn into the refrigerant suction port, the second evaporator having a cooling function for cooling air;

a blower for blowing air to the second evaporator;

a valve member for opening and closing a refrigerant passage of the second evaporator, the valve member being arranged in serious with the second evaporator in a refrigerant flow; and a refrigerant suction pipe having a first end connected to a refrigerant outlet of the second evaporator and a second end connected to the refrigerant suction port, wherein:

the valve member is opened so that refrigerant always flows into the second evaporator when the compressor operates; and the blower is stopped when the cooling function of the second evaporator is stopped.

7. A vapor-compression refrigerant cycle system comprising a compressor which compresses refrigerant;

a refrigerant radiator for cooling high-pressure refrigerant discharged from the compressor;

an ejector which includes a nozzle for decompressing and expanding refrigerant from the refrigerant radiator, a refrigerant suction port from which gas refrigerant is drawn by a refrigerant steam jetted from the nozzle, and a pressure-increasing portion in which the refrigerant jetted from the nozzle and the gas refrigerant drawn from the refrigerant suction port are mixed and pressure of the refrigerant is increased by converting the speed energy to pressure energy;

a first evaporator for evaporating refrigerant flowing out of the pressure-increasing portion of the ejector, the first evaporator being located at a downstream side of the ejector and having a refrigerant outlet coupled to a suction side of the compressor;

a second evaporator for evaporating refrigerant to be drawn into the refrigerant suction port so as to have a cooling function;

a valve member for opening and closing a refrigerant passage of the second evaporator, the valve member being arranged in serious with the second evaporator in a refrigerant flow;

a refrigerant suction pipe having a first end connected to a refrigerant outlet of the second evaporator and a second end connected to the refrigerant suction port; and a control device for controlling operation of the valve member, wherein the control device forcibly opens the valve member when a predetermined time passes after the valve member is closed while the compressor operates.

8. The vapor-compression refrigerant cycle system according to claim 7, wherein the valve member is opened once when the cooling function of the second evaporator is stopped at a time where the compressor starts operation.

9. A vapor-compression refrigerant cycle system comprising a compressor which compresses refrigerant;

a refrigerant radiator for cooling high-pressure refrigerant discharged from the compressor;

an ejector which includes a nozzle for decompressing and expanding refrigerant from the refrigerant radiator, a refrigerant suction port from which gas refrigerant is drawn by a refrigerant steam jetted from the nozzle, and a pressure-increasing portion in which the refrigerant jetted from the nozzle and the gas refrigerant drawn from the refrigerant suction port are mixed and pressure of the refrigerant is increased by converting the speed energy to pressure energy;

a first evaporator for evaporating refrigerant flowing out of the pressure-increasing portion of the ejector, the first evaporator being located at a downstream side of the ejector and having a refrigerant outlet coupled to a suction side of the compressor;

a second evaporator for evaporating refrigerant to be drawn into the refrigerant suction port;

a first valve member for opening and closing a refrigerant passage of the second evaporator, the valve member being arranged in serious with the second evaporator in a refrigerant flow;

a refrigerant suction pipe having a first end connected to a refrigerant outlet of the second evaporator and a second end connected to the refrigerant suction port;

a bypass passage through which refrigerant from the refrigerant radiator flows into the refrigerant suction port while bypassing the second evaporator and the valve member; and a second valve member located in the bypass passage for opening and closing the bypass passage, wherein the second valve member is opened when the first valve member is closed while the compressor operates.

10. The vapor-compression refrigerant cycle system according to claim 3, wherein the refrigerant suction port is provided at a lower portion of the ejector.

11. A vapor-compression refrigerant cycle system comprising a compressor which compresses refrigerant;

a refrigerant radiator for cooling high-pressure refrigerant discharged from the compressor;

an ejector which includes a nozzle for decompressing and expanding refrigerant from the refrigerant radiator, a refrigerant suction port from which gas refrigerant is drawn by a refrigerant steam jetted from the nozzle, and a pressure-increasing portion in which the refrigerant jetted from the nozzle and the gas refrigerant drawn from the refrigerant suction port are mixed and pressure of the refrigerant is increased by converting the speed energy to pressure energy;

a first evaporator for evaporating refrigerant flowing out of the pressure-increasing portion of the ejector, the first evaporator being located at a downstream side of the ejector and having a refrigerant outlet coupled to a suction side of the compressor;

a second evaporator for evaporating refrigerant to be drawn into the refrigerant suction port;

a valve member for opening and closing a refrigerant passage of the second evaporator, the valve member being arranged in serious with the second evaporator in a refrigerant flow; and a refrigerant suction pipe having a first end connected to a refrigerant outlet of the second evaporator and a second end connected to the refrigerant suction port, wherein the refrigerant suction port is provided at an upper side of the ejector.

12. The vapor-compression refrigerant cycle system according to claim 11, wherein the refrigerant suction pipe has a standing portion at a downstream position, and the standing portion extends upwardly to a position higher than the refrigerant suction port.

13. The vapor-compression refrigerant cycle system according to claim 11, further comprising a check valve located at an inlet portion of the refrigerant suction port to allow a refrigerant flow from the refrigerant suction pipe to the refrigerant suction port.

14. The vapor-compression refrigerant cycle system according to claim 11, further comprising an auxiliary valve member arranged in a refrigerant passage through which refrigerant from the second evaporator is introduced to the refrigerant suction port of the compressor, wherein:

the valve member is located at an inlet portion of the refrigerant suction port;

the auxiliary valve member is opened when the valve member is closed, so that the refrigerant flowing out of the second evaporator flows into the suction side of the compressor.

15. The vapor-compression refrigerant cycle system according to claim 11, wherein the second evaporator is arranged to perform a cooling operation for cooling air, the system further comprising a blower for blowing air to the second evaporator, wherein:

the valve member is opened so that refrigerant always flows into the second evaporator when the compressor operates; and the blower is stopped when the cooling function of the second evaporator is stopped.

16. The vapor-compression refrigerant cycle system according to claim 11, wherein the valve member is forcibly opened, when a predetermined time passes after the valve member is closed while the compressor operates.

17. The vapor-compression refrigerant cycle system according to claim 16, wherein:

the first evaporator is arranged to perform a cooling operation of a first portion;

the second evaporator is arranged to perform a cooling operation of a second portion by performing heat exchange with air; and when the cooling operation of the second evaporator is stopped when the compressor stats operating, the valve member is opened once for a predetermined time.

18. The vapor-compression refrigerant cycle system according to claim 11, further comprising:

a bypass passage through which refrigerant from the refrigerant radiator flows into the refrigerant suction port while bypassing the second evaporator and the valve member;

an auxiliary valve member located in the bypass passage for opening and closing the bypass passage, wherein the auxiliary valve member is opened when the valve member is closed while the compressor operates.

* * * * *